No. 743,720. PATENTED NOV. 10, 1903.
E. HENNING.
HAY RAKE.
APPLICATION FILED FEB. 9, 1903.
NO MODEL.
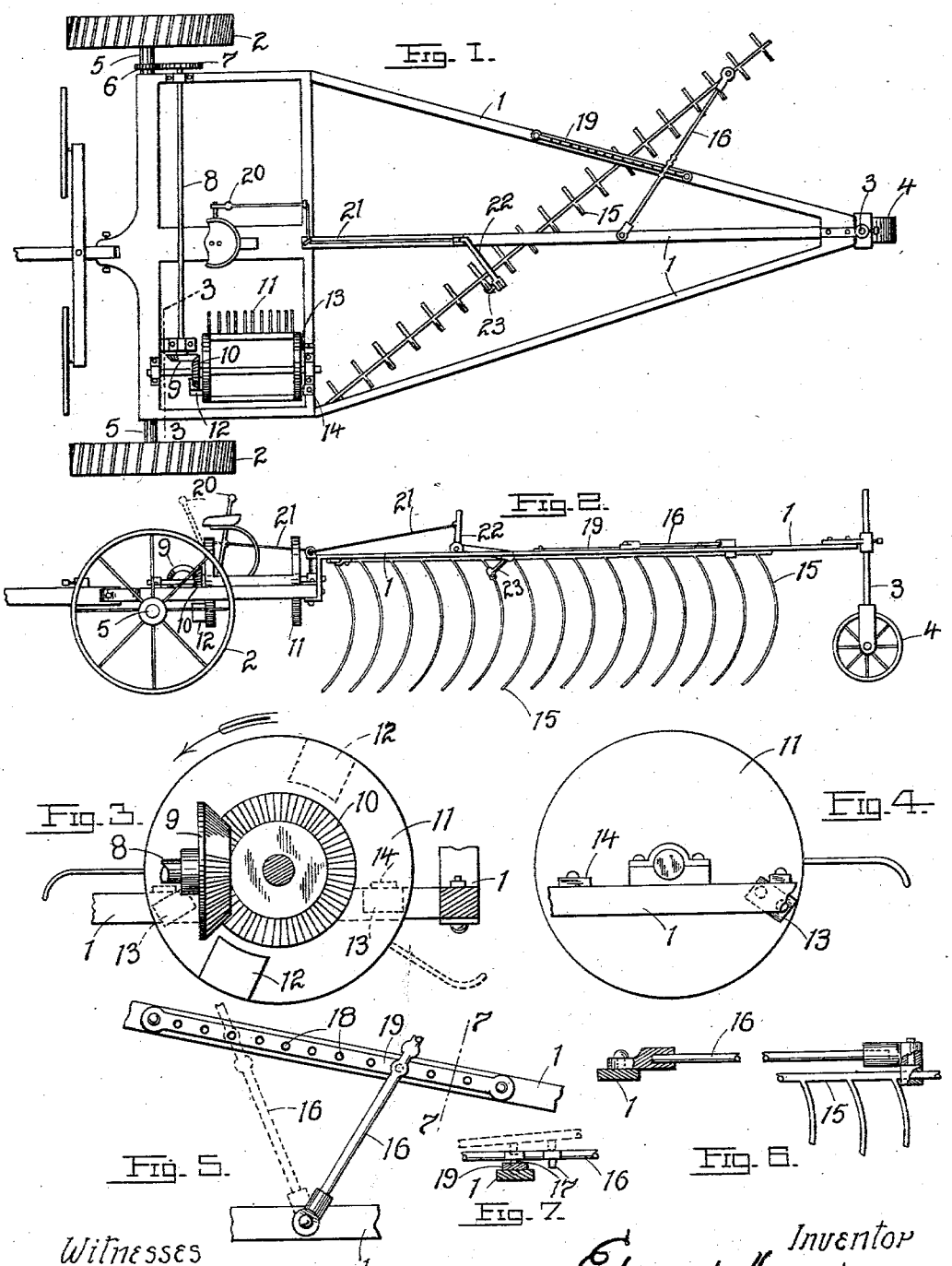
Witnesses
Inventor
Edward Henning
By His Attorney
Emil Starek No. 743,720. Patented November 10, 1903.

UNITED STATES PATENT OFFICE.

EDUARD HENNING, OF CRETE, ILLINOIS.

HAY-RAKE.

SPECIFICATION forming part of Letters Patent No. 743,720, dated November 10, 1903.

Application filed February 9, 1903. Serial No. 142,644. (No model.)

*To all whom it may concern:*

Be it known that I, EDUARD HENNING, a citizen of the United States, residing at Crete, in the county of Will and State of Illinois, have invented certain new and useful Improvements in Hay-Rakes, of which the following is a full, clear, and exact description, reference being had to the accompanying drawings, forming a part hereof.

My invention has relation to improvements in side-delivery rakes; and it consists in the novel arrangement and combination of parts more fully set forth in the specification, and pointed out in the claim.

In the drawings, Figure 1 is a top plan of the rake. Fig. 2 is a side elevation thereof. Fig. 3 is an enlarged sectional detail on line 3 3 of Fig. 1. Fig. 4 is a rear view of Fig. 3. Fig. 5 is a detail showing manner of changing the angle of the rear rake. Fig. 6 is a detail showing manner of mounting the outer end of the rear rake, and Fig. 7 is a section on line 7 7 of Fig. 5.

The object of my invention is to construct a side-delivery hay-rake in which the danger of the clogging of the hay at the forward end of the rake shall be wholly eliminated, one in which the rear rake can be tilted to clear the pile by means of a lever actuated by the driver, and one possessing further and other advantages better apparent from a detailed description of the invention, which is as follows:

Referring to the drawings, 1 represents a frame whose forward end is mounted on rollers 2 2, the rear end being provided with a forked bracket 3, in which is mounted a wheel 4. The shaft 5 of the rollers carries at one end a pinion 6, meshing with a gear-wheel 7 at the adjacent end of a parallel shaft 8, the opposite end of the latter shaft carrying a partially-toothed bevel-pinion 9, meshing with a pinion 10 at the adjacent end of the axis of a revolving cylindrical rake 11. The forward head of the rake 11 carries a counterbalance-weight 12, and the rear head is provided with a plate 13, adapted to strike a lug 14 on the frame. The arrangement of gearing as described serves to impart (as the machine is drawn along the field) a partial rotation or oscillation to the rake 11, the latter revolving so long as the toothed section of the pinion 9 is in engagement with the pinion 10, and when the blank section of the pinion 9 is reached the weight 12 causes the rake to swing back and bring the rake-teeth in position to resume a fresh hold or grip on the hay accumulating at that end of the rear rake (to be presently referred to) and cast such accumulated portions to one side of the machine. To prevent the inertia of the rake 11 carrying it over too far when once started in its rotation, the plate 13 strikes the lug 14 at the moment the blank section of the pinion 9 comes opposite the teeth of the pinion 10.

The rear rake 15 is hinged to the frame, the outer end of the said rake having a bearing in the outer end of an arm 16, whose inner end is pivoted to the frame, the under surface of said arm being provided with a number of teats or pins 17, which engage a series of openings 18, formed in a bar 19, carried by the frame, whereby the angular disposition of the rear rake may be varied at will, according to the angle to which the arm 16 is swung, Fig. 5. Pivoted at the forward end of the frame is a lever 20, from which leads a wire or cord 21 to a bell-crank lever 22, the rear arm of the latter being coupled to the rear rake by a link 23. In this way the rear rake may be tilted or lifted from the seat occupied by the driver.

From the foregoing it will be seen that as the hay is gathered by the rear rake the forward end thereof is kept clear of undue accumulations by the oscillations of the rotary rake, which throws them to one side.

Having described my invention, what I claim is—

In a side-delivery rake, a cylindrical rotary rake having terminal heads, a balance-weight on one head, a plate on the opposite head, a bevel gear-wheel mounted at one end of the axis of the rotary rake, a partially-toothed bevel-gear engaging the gear aforesaid, and a lug carried by the machine-frame for engaging said plate, substantially as set forth.

In testimony whereof I affix my signature in presence of two witnesses.

EDUARD HENNING.

Witnesses:
MARTIN SALLER,
OTTO J. MEIER.